L. S. STARRETT AND J. A. ADELL.
FINE ADJUSTMENT BEVEL PROTRACTOR AND THE LIKE.
APPLICATION FILED MAR. 6, 1920.
1,384,105.
Patented July 12, 1921.
2 SHEETS—SHEET 2.
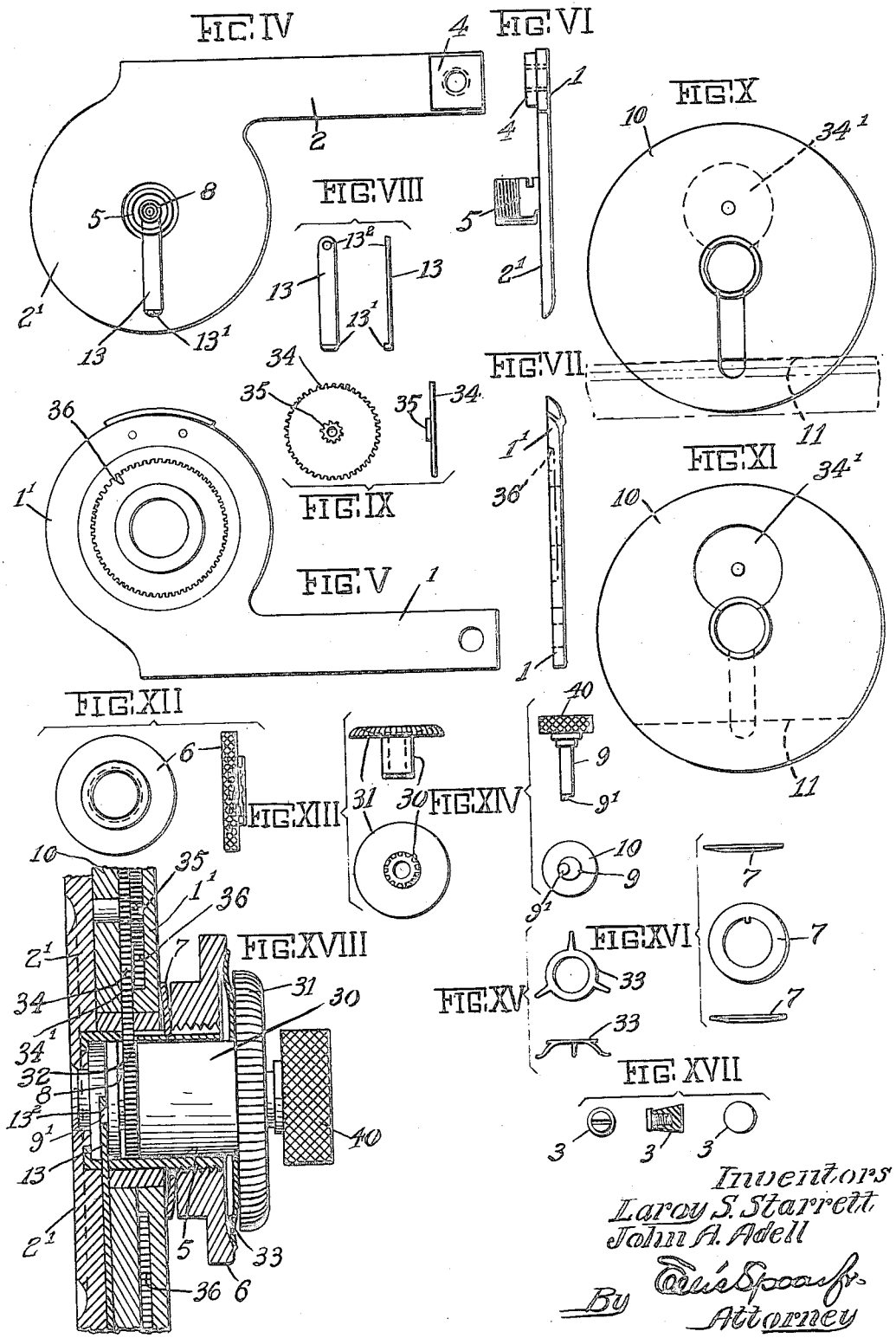

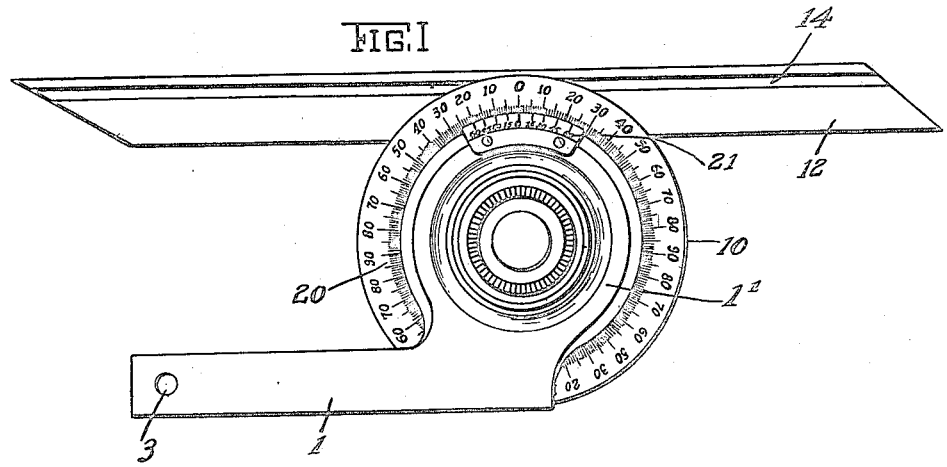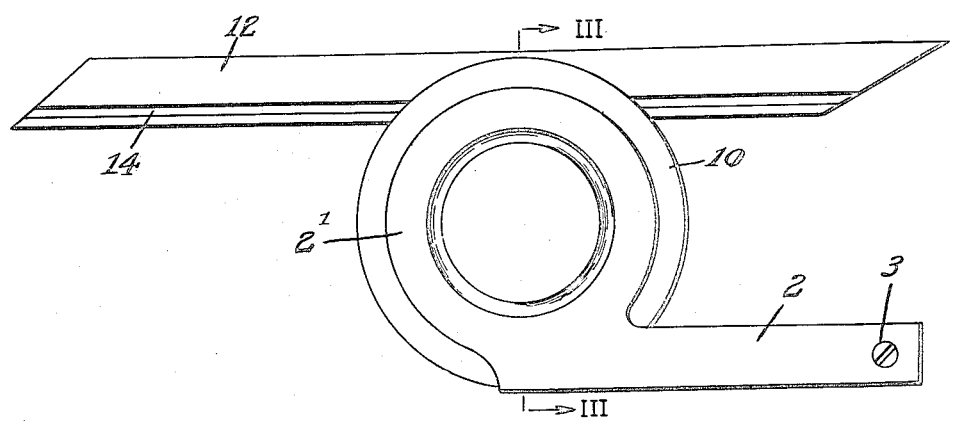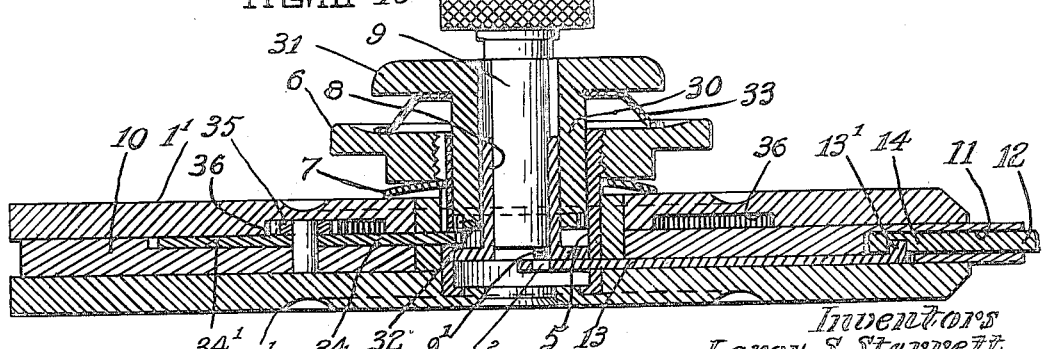

UNITED STATES PATENT OFFICE.

LAROY S. STARRETT AND JOHN A. ADELL, OF ATHOL, MASSACHUSETTS, ASSIGNORS TO THE L. S. STARRETT COMPANY, OF ATHOL, MASSACHUSETTS, A CORPORATION OF MASSACHUSETTS.

FINE-ADJUSTMENT BEVEL-PROTRACTOR AND THE LIKE.

1,384,105.          Specification of Letters Patent.      Patented July 12, 1921.

Application filed March 6, 1920. Serial No. 363,690.

*To all whom it may concern:*

Be it known that we, LAROY S. STARRETT and JOHN A. ADELL, citizens of the United States, residing at Athol, county of Worcester, Commonwealth of Massachusetts, have invented certain new and useful Improvements in Fine-Adjustment Bevel-Protractors and the like, of which the following is a specification.

The subject matter of this invention is a fine adjustment bevel protractor. It is exceedingly difficult to adjust a protractor with any degree of accuracy or certainty by hand as the setting of the vernier is too fine to be accomplished by any ordinary manual manipulation without great care and patience. It has been proposed therefore to provide such protractors with what is termed a fine adjustment, that is an adjustment capable of transmitting a slow positive movement as through a geared connection.

The problem of embodying such an adjustment in an instrument of this sort in such a way as not to interfere with the normal functioning of the instrument and so that the delicate parts of the structure will be at once protected and yet convenient and capable of rapid manipulation is one of obvious difficulty.

In accordance with our invention we have produced an improved protractor embodying these desired points through certain novel principles and structures which will be more fully described hereinafter.

As illustrative of our invention we have shown in the accompanying drawings a form of protractor well adapted to practical use and capable of commercial production. Throughout the specification and drawings like reference numerals are employed to indicate corresponding parts, and in the drawings:

Figure I is a face view of a protractor in accordance with our invention.

Fig. II a view of the opposite face.

Fig. III a sectional view through the central locking and control system of the turret.

Fig. IV an interior face view of one of the frame members.

Fig. V a similar view of the other member.

Figs. VI and VII are end views of the members shown in Figs. IV and V, respectively.

Fig. VIII a detail view of the blade locking slide.

Fig. IX a detail group of the intermediate pinion.

Fig. X a view of one face of the turret head.

Fig. XI a face view of the other side of the same.

Fig. XII a detail group of the turret lock.

Fig. XIII a detail group of the fine adjustment control.

Fig. XIV a corresponding group of the blade lock control.

Fig. XV a similar group of views showing the spring spider for holding the fine adjustment control out of position.

Fig. XVI a three view group of the interposed turret lock washer.

Fig. XVII a three view detail group of the frame bolt, and

Fig. XVIII is an enlarged detail of the central turret system showing the fine adjustment control pushed into operating position.

In the form shown our protractor consists of the usual frame members 1 and 2. The shanks of these members are connected through a wedge bolt 3 the details of which will be found in Fig. XVII. This bolt 3 draws the two frames together snugly on the interposed block 4. Between the frame disks $1^1$, $2^1$ is mounted the rotatable turret or head 10. This head is slotted at 11 to receive the adjustable and reversible blade 12. The turret is provided with the usual scale 20 and the frame member 1 with a vernier 21. Referring to Fig. IV it will be seen that the inner face of the disk $2^1$ of the frame member 2 is radially recessed and holds a blade lock 13 having an upturned end $13^1$ which engages in either of the slots 14 of the blade 12. The end of the blade lock 13 has an opening $13^2$. This end of the blade lock projects through a central tubular stud or bearing 5 which is fixed on the inner face of the frame disk $2^1$. This tubular stud 5 constitutes the central bearing of the turret 10 and on it is also assembled the other frame disk member $1^1$. The outer end of this tubular bearing 5 is threaded and receives a large knurled nut 6 beneath which is a slightly dished washer 7 splined to this tubular bearing 5 which is longitudinally slotted to hold it against turning. The nut 6 constitutes a turret lock. By tightening up on it the turret is set in any adjusted position, and by loosening it the turret is freed for adjustment.

Within the stem 5 is a smaller concentric tubular member 8 also slotted to receive the inner end of the blade lock 13 and within this is frictionally held the stem 9 of the blade lock control. This control has a knurled head 40 and on its inner end an eccentric stud 9¹ which enters the hole 13² of the blade lock slide 13 so that upon rotation of the knurled head 40 this slide is moved radially to lock or unlock the blade through the release or tightening of its hooked end 13¹ in the slot 14.

Between the concentric tubular members 5 and 8 is the tubular stem 30 of the fine adjustment actuator. This stem at its upper end has a knurled knob 31 and at its inner end is cut with an external pinion 32. The stem 30 is ordinarily held retracted by a spider shaped spring 33 for details of which see Fig. XV. The legs of this spring bear on the recessed top of the knurled head 6 and the central ring fits snugly under the knurled head 31. The inner end 32 of this fine adjustment actuator meshes with a gear 34 which lies in a recess 34¹ in one face of the turret as shown in Fig. XI. This gear appears in Fig. IX carrying a small central pinion 35 which in turn meshes with an internal annular rack 36 set into the inner face of the disk 1¹ of the frame member 1.

In this manner when the stem 30 is pushed in and the knurled head 31 is rotated, the turret 10 is given a reduced rotative movement within its frames so that very fine adjustment of the scale and vernier may be made. As soon as pressure on the knurled head 31 is relieved the spider 33 disengages the toothed end of the stem 30 throwing the fine adjustment gears out of mesh. It will therefore be seen by reference to Figs. III and XVIII that our protractor has centrally of its turret a complete and concentric control system for both blade lock, turret lock and fine adjustment control. These are all assembled and self-contained. The fine adjustment control may be said to be permanently embodied in the instrument as distinguished from any removable or detachable part such as a key, all in convenient concentric position for thumb and finger engagement in only slightly removed axial planes. The overlying and outwardly projecting blade lock control protects the axially movable fine adjustment control and the extended margin of the turret lock nut further protects the fine adjustment control and also makes possible the immediate locking of the adjusted turret once it is set. Owing, however, to the automatic withdrawal of the fine adjustment control there is no danger of disturbing the adjustment during the locking of the turret.

The above and various other advantages both in use and manufacture are believed to be sufficiently obvious as not to require further detail description for those skilled in the art. While the illustrated embodiment is shown in considerable mechanical detail and while certain features of such detail are to be claimed herein, the broader principles of applicants' invention are not to be construed as limited save by the terms of the claims drawn thereto.

What we therefore claim and desire to secure by Letters Patent is:

1. In an instrument of the class described, a frame, a turret revolubly mounted therein, an auxiliary adjusting means for said turret including an operating member permanently embodied in said instrument and positionable in an engaged or disengaged relation to said adjusting means.

2. In an instrument of the class described, a frame, a turret revolubly mounted therein, an auxiliary adjusting mechanism for said turret including an operating member mounted in the axis of the turret, and gear connections between said adjusting mechanism and said operating member.

3. In an instrument of the class described, a frame, a turret revolubly mounted therein, an auxiliary adjusting mechanism for said turret including an operating member positionable in an engaged or disengaged relation to said adjusting mechanism, and gear connections between said adjusting mechanism and said operating member.

4. In an instrument of the class described, a frame, a turret revolubly mounted therein, an auxiliary adjusting means for said turret including an operating member mounted in the axis of said turret.

5. In an instrument of the class described, a frame, a turret revolubly mounted therein, an auxiliary adjusting means for said turret including an operating member mounted in the axis of said turret and positionable in an engaged or disengaged relation to said adjusting means.

6. In an instrument of the class described, a frame, a turret revolubly mounted therein, a blade slidably mounted in said turret, an auxiliary adjusting means for said turret including an operating member for said auxiliary adjusting means, a lock for said turret and a lock for said blade, said operating member, turret and blade locks all disposed in the axis of said turret.

7. In an instrument of the class described, a frame, a turret revolubly mounted therein, a blade slidably mounted in said turret, an auxiliary adjusting means for said turret including an operating member for said auxiliary adjusting means, a lock for said turret and a lock for said blade, said operating member, turret and blade locks all disposed in the axis of said turret, and said operating member being axially movable into operating and non-operating position relative to said auxiliary adjusting means.

8. In an instrument of the class described, a frame, a blade, a blade turret rotatably mounted therein, a tubular bearing for said turret, a concentric tubular guide, a blade lock actuator in said guide, a tubular operating member disposed between said bearing and guide and actuating mechanism operable by said operating member for rotating said turret relative to said frame.

9. In an instrument of the class described, a pair of relatively adjustable pivoted members, and an auxiliary adjusting mechanism including an operating member mounted in the pivot for said members and positionable in engaged or disengaged relation to said adjusting mechanism.

10. In a protractor, a frame, an adjustable member pivotally mounted therein, an auxiliary adjusting mechanism for said member, and an operating member mounted in the pivot for said adjustable member and movable in the line of said pivot to engage and disengage said auxiliary adjusting mechanism.

11. In a blade protractor, a frame, a turret revolubly mounted therein, and an auxiliary adjusting means for said turret and disposed in the axis thereof.

12. In a blade protractor, a frame, a turret revolubly mounted therein, a blade slidably mounted in said turret, and a locking system for said blade and disposed centrally of said turret.

13. In a blade protractor, a frame, a turret revolubly mounted therein, a blade slidably mounted in said turret, and a concentric locking system for said blade and turret.

14. In a blade protractor, a turret revolubly mounted therein, auxiliary adjusting means for said turret, a blade slidably mounted in said turret, a blade lock and concentric operating stems for the blade lock and adjusting means.

15. In an instrument of the class described, a pair of frame members, a turret rotatably mounted between said members, an internal gear on one frame member, a pinion on said turret and engaged with said gear, and means for turning said pinion to rotate said turret in said frame.

16. In an instrument of the class described, a frame, a tubular bearing, a turret rotatably mounted thereon, auxiliary adjusting means for said turret, a tubular operating stem for said adjusting means disposed in said turret bearing, a blade adjustably mounted in said turret, a lock for said blade, and an operating stem for said blade lock disposed in said adjusting stem.

17. In an instrument of the class described comprising a frame, a turret having a blade seat slot in its edge, a blade adjustably mounted in said slot, and a radial blade lock inset in said turret and engaging said blade in said slot.

In testimony whereof we affix our signatures in the presence of witnesses.

LAROY S. STARRETT.

Witnesses:
ETHEL C. STOCKWELL,
LILA M. WHIPPLE.

JOHN A. ADELL.

Witnesses:
ARTHUR H. STARRETT,
ERNEST E. FARR.